US008809419B2

(12) United States Patent
André et al.

(10) Patent No.: US 8,809,419 B2
(45) Date of Patent: Aug. 19, 2014

(54) POLYMERIC DISPERSANTS AND NON-AQUEOUS DISPERSIONS

(75) Inventors: Xavier André, Antwerpen (BE); Johan Loccufier, Zwijnaarde (BE)

(73) Assignee: Agfa Graphics NV, Mortsel (BE)

( * ) Notice: Subject to any disclaimer, the term of this patent is extended or adjusted under 35 U.S.C. 154(b) by 273 days.

(21) Appl. No.: 13/320,757

(22) PCT Filed: Jun. 3, 2010

(86) PCT No.: PCT/EP2010/057770
§ 371 (c)(1),
(2), (4) Date: Nov. 16, 2011

(87) PCT Pub. No.: WO2010/145950
PCT Pub. Date: Dec. 23, 2010

(65) Prior Publication Data
US 2012/0071593 A1 Mar. 22, 2012

Related U.S. Application Data

(60) Provisional application No. 61/218,995, filed on Jun. 22, 2009.

(30) Foreign Application Priority Data

Jun. 19, 2009 (EP) .................................... 09163202

(51) Int. Cl.
| | | |
|---|---|---|
| B41J 2/01 | (2006.01) | |
| B41J 2/17 | (2006.01) | |
| B41J 2/175 | (2006.01) | |
| C07D 243/08 | (2006.01) | |
| C08F 8/30 | (2006.01) | |
| C08G 18/28 | (2006.01) | |
| C08G 63/60 | (2006.01) | |
| C08G 69/26 | (2006.01) | |
| C08K 5/34 | (2006.01) | |
| C08K 5/48 | (2006.01) | |
| C08L 39/00 | (2006.01) | |
| C08L 67/00 | (2006.01) | |
| C08L 73/00 | (2006.01) | |
| C08L 75/00 | (2006.01) | |
| C08L 77/00 | (2006.01) | |
| C08L 79/00 | (2006.01) | |
| C09B 67/00 | (2006.01) | |
| C09D 5/00 | (2006.01) | |
| C09D 11/00 | (2014.01) | |
| D21H 17/55 | (2006.01) | |
| G01D 11/00 | (2006.01) | |
| C08G 73/02 | (2006.01) | |
| C08L 77/06 | (2006.01) | |
| C09D 11/10 | (2014.01) | |
| C08L 79/02 | (2006.01) | |

(52) U.S. Cl.
CPC ................ *C09D 11/36* (2013.01); *C09D 11/40* (2013.01); *C08G 73/0206* (2013.01); *C08G 69/26* (2013.01); *C08L 77/06* (2013.01); *C09D 11/326* (2013.01); *C09D 11/101* (2013.01); *C08L 79/02* (2013.01)
USPC .................. 523/160; 347/1; 347/85; 347/95; 347/100; 523/161; 524/90; 524/92; 524/555; 524/590; 524/599; 524/606

(58) Field of Classification Search
USPC .......... 523/160, 161; 524/590, 555, 599, 606, 524/90, 92; 347/1, 85, 95, 100
See application file for complete search history.

(56) References Cited

U.S. PATENT DOCUMENTS

| | | | |
|---|---|---|---|
| 4,119,615 A | 10/1978 | Schulze | |
| 5,286,267 A | 2/1994 | Su et al. | |
| 5,645,752 A * | 7/1997 | Weiss et al. | ................. 252/62.54 |

FOREIGN PATENT DOCUMENTS

| | | |
|---|---|---|
| DE | 3608153 A1 | 9/1987 |
| EP | 1 790 697 A1 | 5/2007 |
| EP | 1 790 698 A1 | 5/2007 |
| EP | 1 990 357 A1 | 11/2008 |
| WO | 2007/006635 A2 | 1/2007 |
| WO | 2007/060254 A2 | 5/2007 |

OTHER PUBLICATIONS

Official Communication issued in International Patent Application No. PCT/EP2010/057770, mailed on Jul. 22, 2010.

* cited by examiner

*Primary Examiner* — Patrick Niland
(74) *Attorney, Agent, or Firm* — Keating & Bennett, LLP

(57) ABSTRACT

A non-aqueous pigment dispersion includes a pigment, a non-aqueous dispersion medium, and a polymeric dispersant including at least one oxalylamide structural unit according to Formula (I):

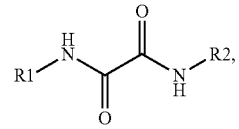

Formula (I)

wherein:
R1 represents a first polymeric moiety selected from the group consisting of a linear polymeric moiety, a star shaped polymeric moiety, a dendritic polymeric moiety, a branched polymeric moiety, and a hyperbranched polymeric moiety; and
R2 represents a second polymeric moiety selected from the group consisting of a polyester, a polyether, a polyamide, a polyacrylate, a polymethacrylate, or copolymers thereof.

13 Claims, No Drawings

POLYMERIC DISPERSANTS AND NON-AQUEOUS DISPERSIONS

CROSS-REFERENCE TO RELATED APPLICATIONS

This application is a 371 National Stage Application of PCT/EP2010/057770, filed Jun. 3, 2010. This application claims the benefit of U.S. Provisional Application No. 61/218,995, filed Jun. 22, 2009, which is incorporated by reference herein in its entirety. In addition, this application claims the benefit of European Application No. 09163202.6, filed Jun. 19, 2009, which is also incorporated by reference herein in its entirety.

BACKGROUND OF THE INVENTION

1. Field of the Invention

The present invention relates to specific polymeric dispersants and stable pigment dispersions and inkjet inks made with the specific polymeric dispersant.

2. Description of the Related Art

A dispersant is a substance for promoting the formation and stabilization of a dispersion of pigment particles in a dispersion medium. Dispersants are generally surface-active materials having an anionic, cationic or non-ionic structure. The presence of a dispersant substantially reduces the dispersing energy required. Dispersed pigment particles may have a tendency to re-agglomerate after the dispersing operation, due to mutual attraction forces. The use of dispersants counteracts this re-agglomeration tendency of the pigment particles.

The dispersant has to meet particularly high requirements when used for inkjet inks. Inadequate dispersing manifests itself as increased viscosity in liquid systems, loss of brilliance and/or hue shifts. Moreover, particularly good dispersion of the pigment particles is required to ensure unimpeded passage of pigment particles through the nozzles of a print head, which are usually only a few micrometers in diameter. In addition, pigment particle agglomeration and the associated blockage of the printer nozzles has to be avoided in the standby periods of the printer.

Polymeric dispersants typically contain in one part of the molecule so-called anchor groups, which adsorb onto the pigments to be dispersed. In a spatially separate part of the molecule, polymeric dispersants have polymer chains compatible with the dispersion medium, thus stabilizing the pigment particles in the dispersion medium. Typical polymeric dispersants include graft copolymer and block copolymer dispersants.

In aqueous inkjet inks, the polymeric dispersants generally contain hydrophobic anchor groups exhibiting a high affinity for the pigment surface and hydrophilic polymer chains for stabilizing the pigments in the aqueous dispersion medium.

The preparation of good thermally stable dispersions with submicron particles is more difficult for non-aqueous inkjet inks, such as solvent based, oil based and radiation curable inkjet inks. The pigments are especially difficult to disperse when they have a non-polar surface.

These problems have led to the design of very specific polymeric dispersants wherein the anchor groups are pigment derivatives. For example, WO 2007/006635 (AGFA GRAPHICS) discloses pigment dispersions including a colour pigment and a polymeric dispersant having via a linking group covalently linked to its polymeric backbone at least one pending chromophore group which has a molecular weight smaller than 90% of the molecular weight of the colour pigment.

Another approach for dispersing pigments with non-polar surfaces in non-aqueous dispersion media is changing the surface to a more polar surface by addition of compounds known as dispersion synergists. A dispersion synergist is a compound that promotes the adsorption of the polymeric dispersant on the surface of the pigment. It is often suggested that the synergist should possess the pigment structure substituted by one or more sulphonic acid groups, carboxylic acid groups or ammonium salts thereof. Examples of these dispersion synergists are given in, for example, WO 2007/060254 (AGFA GRAPHICS), EP 1790697 A (AGFA GRAPHICS) and EP 1790698 A (AGFA GRAPHICS).

However, both approaches lead to a considerable higher cost of the pigment dispersion. It is desirable to make stable pigment dispersions not requiring dispersion synergists or polymeric dispersants wherein the anchor groups are pigment derivatives. For consistent image quality, inkjet inks require a dispersion stability capable of dealing with high temperatures (above 60° C.) during transport of the ink to a customer, jetting at elevated temperatures and changes in the dispersion medium of the inkjet ink during use, for example, evaporation of solvent and increasing concentrations of humectants, penetrants and other additives.

U.S. Pat. No. 4,119,615 (TEXACO) discloses thermoplastic adhesive compositions comprising a polyoxamide formed by reacting a polyoxypropylene polyamine selected from the group consisting of diamines, triamines and mixtures thereof, and having an average molecular weight of about 190 to about 3,000 with oxalic acid to form a liquid prepolymer, said prepolymer being further reacted with a diamine. U.S. Pat. No. 4,119,615 (TEXACO) is silent on pigment dispersions.

U.S. Pat. No. 5,286,267 (TEXACO) discloses a polyether hydroxyethylaminoethyl oxalamide as gasoline detergent additive. U.S. Pat. No. 5,286,267 (TEXACO) is also silent on pigment dispersions.

DE 3608153 (BASF) discloses a coating composition for wood containing medium- to long-oil alkyd resins as binder and low molecular weight oxalic acid diamide derivatives as an UV-absorber.

Therefore, it is highly desirable to manufacture low cost non-aqueous pigment dispersions, especially pigmented inkjet inks, exhibiting a high dispersion quality and stability.

SUMMARY OF THE INVENTION

In order to overcome the problems described above, it has been surprisingly found that non-aqueous pigment dispersions, especially non-aqueous inkjet inks, of high dispersion quality and stability were obtained by using a polymeric dispersant in a non-aqueous pigment dispersion as defined below. The stabilization of pigments was accomplished without an expensive surface modification by addition of a dispersion synergist. In addition, also an unexpected improvement in adhesion on a plurality of substrates was observed.

The method for preparing the polymeric dispersant can be labelled as "green chemistry" since the dialkyloxalates used are less toxic than e.g. isocyanate-derivatives frequently used to prepare polymeric dispersants. In addition, a better control of the reaction is possible compared to that of the multifunctional NCO chemistry used to prepare BYK™ polymeric dispersants and the chain scission mechanisms to prepare the SOLSPERSE™ polymeric dispersants by condensation. Furthermore, in contrast to SOLSPERSE™ chemistry, no heavy metal catalyst is needed for the condensation chemistry involving oxalates or oxalylamides.

Preferred embodiments of the present invention produce images of high image quality with non-aqueous pigment dispersions, especially with non-aqueous inkjet inks.

Other features, elements, steps, characteristics and advantages of the present invention will become more apparent from the following detailed description of preferred embodiments of the present invention hereinafter.

DETAILED DESCRIPTION OF THE PREFERRED EMBODIMENTS

Definitions

The term "colorant", as used in the preferred embodiments of the present invention, means dyes and pigments.

The term "dye", as used in the preferred embodiments of the present invention means a colorant having a solubility of 10 mg/L or more in the medium in which it is applied and under the ambient conditions pertaining.

The term "pigment" is defined in DIN 55943, herein incorporated by reference, as a colouring agent that is practically insoluble in the application medium under the pertaining ambient conditions, hence having a solubility of less than 10 mg/L therein.

The term "C.I." is used in disclosing the present application as an abbreviation for Colour Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term "P(EO-co-PO)" is used as an abbreviation for a copolymer of ethyleneoxide and propyleneoxide.

Polymeric Dispersants

The polymeric dispersant used in the non-aqueous pigment dispersion according to a preferred embodiment of the present invention includes at least one oxalylamide structural unit according to Formula (I):

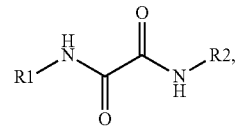

Formula (I)

wherein:

R1 represents a first polymeric moiety selected from the group consisting of a linear polymeric moiety, a star shaped polymeric moiety, a dendritic polymeric moiety, a branched polymeric moiety and a hyperbranched polymeric moiety; and R2 represents a second polymeric moiety selected from the group consisting of a polyester, a polyether, a polyamide, a polyacrylate, a polymethacrylate or copolymers thereof.

R2 is preferably a copolymer of ethyleneoxide and propylene oxide, preferably in an amount of 6 to 21 mol % based on the polymeric dispersant.

In a preferred embodiment of the polymeric dispersant, the first polymeric moiety R1 is a branched polymeric moiety or hyperbranched polymeric moiety. The hyperbranched polymeric moiety is preferably a polyalkyleneimine, more preferably a polyethylene imine. The polyethylene imine preferably has a molecular weight Mw smaller than 20,000 g/mol.

Preferred examples of the first polymeric moiety R1 include a linear polyethyleneimine (see R1-A in Table 1), a hyperbranched polyethyleneimine (see R1-B in Table 1) and a polyallylamine (see R1-C in Table 1).

TABLE 1

R1-A

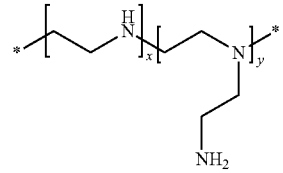

with x representing an integer from 1 to 1100
with y representing an integer from 0 to 900

R1-B

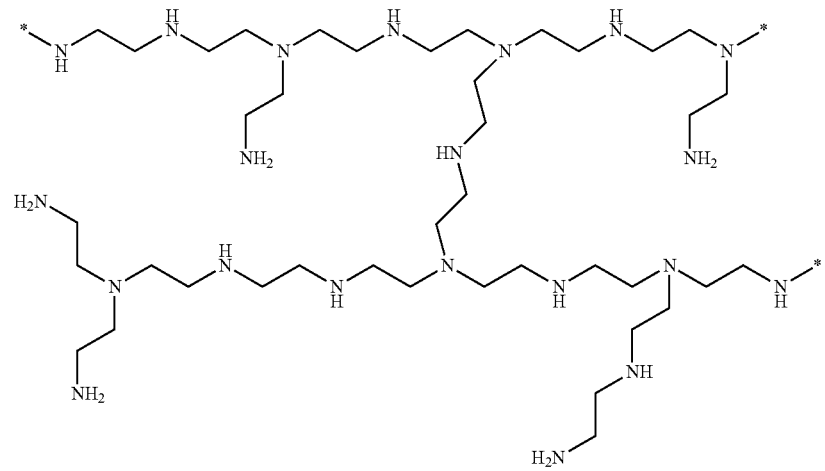 [SMILES: *NCCNCCN(CCN)CCNCCN(CCNCCN(*)CCN)CCNCCN(CCNCCNCCN(CCN)CCN)CCNCCN(CCN*)CCNCCN]

TABLE 1-continued

R1-C

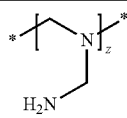

with z representing an integer from 100 to 1200

In a preferred embodiment of the polymeric dispersant, the second polymeric moiety R2 is selected from the group consisting of a polyester and a polyether. Most preferably the second polymeric moiety is a polyether.

In a preferred embodiment of the polymeric dispersant, the first polymeric moiety is further substituted by at least one structural unit according to the Formula (II):

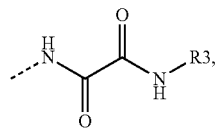

Formula (II)

wherein:
R3 represents a functional group including at least one nitrogen containing five or six membered heteroaromatic ring.

Preferred functional groups R3 in Formula (II) include the anchor groups Anchor-1 to Anchor-3 in Table 3.

In a preferred embodiment of the polymeric dispersant, R3 comprises at least one nitrogen containing five or six membered heteroaromatic ring selected from the group consisting of an optionally substituted benzimidazole, an optionally substituted imidazole and an optionally substituted pyridine. In a more preferred embodiment, the at least one nitrogen containing five or six membered heteroaromatic ring is imidazole or pyridine, most preferably pyridine.

The nitrogen containing five or six membered heteroaromatic ring is preferably present in an amount of less than 12 mol %, more preferably less than 8 mol % of the polymeric dispersant.

In a preferred embodiment, the polymeric dispersant is represented by Formula (III):

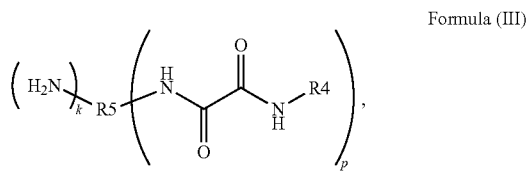

Formula (III)

wherein:
R4 represents a polymeric chain selected from the group consisting of a polyether and a polyester;
R5 represents a branched polymeric core or a hyperbranched polymeric core;
k represents an integer from 0 to 600, more preferably from 0 to 300; and
p represents an integer from 1 to 900, more preferably from 6 to 700.

A preferred example of the hyperbranched polymeric core R5 in Formula (III) is a hyperbranched polyethyleneimine (see R1-B in Table 1).

Preferred grafts which can be used to form the polymeric chain R4 in Formula (III) are listed in Table 2.

TABLE 2

Graft-1

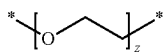

with z representing an integer from 3 to 500

Graft-2

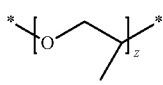

with z representing an integer from 2 to 50

Graft-3

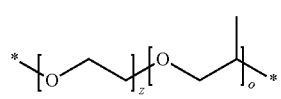

with z representing an integer from 1 to 40
with o representing an integer from 1 to 40

TABLE 2-continued

Graft-4

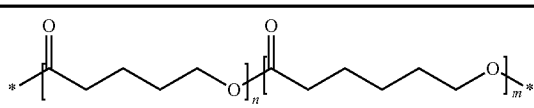

with n representing an integer from 3 to 100
with m representing an integer from 3 to 100

Graft-5

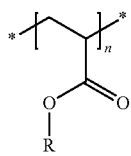

with n representing an integer from 3 to 100

In a preferred embodiment, the polymeric dispersant is represented by Formula (IV):

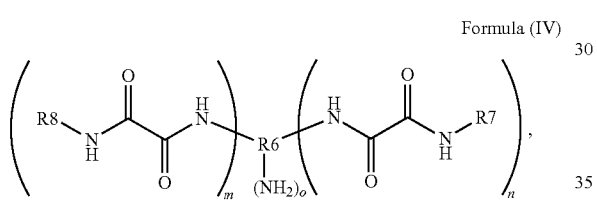

Formula (IV)

wherein:

R6 represents a branched polymeric core or hyperbranched polymeric core;

R7 represents a polymeric chain selected from the group consisting of a polyether and a polyester;

R8 represents a functional group including at least one nitrogen containing five or six membered heteroaromatic ring;

n represents an integer from 1 to 900; more preferably from 6 to 700 m represents an integer from 0 to 720; more preferably from 0 to 400; and o represents an integer from 0 to 600, more preferably from 0 to 300.

A preferred example of the hyperbranched polymeric core R6 in Formula (IV) is a hyperbranched polyethyleneimine (see R1-B in Table 1).

Preferred grafts which can be used to form the polymeric chain R7 in Formula (IV) are listed in Table 2.

Preferred functional groups R8 in Formula (IV) include the anchor groups Anchor-1 to Anchor-5 in Table 3.

TABLE 3

| Anchor-1 | 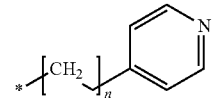 |
| --- | --- |
| | with n representing an integer from 0 to 4 |
| Anchor-2 | 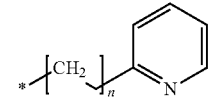 |
| | with n representing an integer from 0 to 4 |
| Anchor-3 | 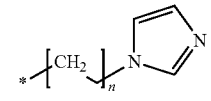 |
| | with n representing an integer from 0 to 6 |
| Anchor-4 |  |
| | with n representing an integer from 0 to 7 |
| Anchor-5 | 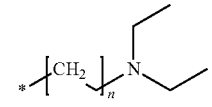 |
| | with n representing an integer from 0 to 7 |

A preferred polymeric dispersant has a molecular weight $M_n$ smaller than 30,000 and contains pyridine anchor groups.

A very preferred polymeric dispersant can be schematized by Formula (V) wherein the hyperbranched core is a hyperbranched polyethylene imine:

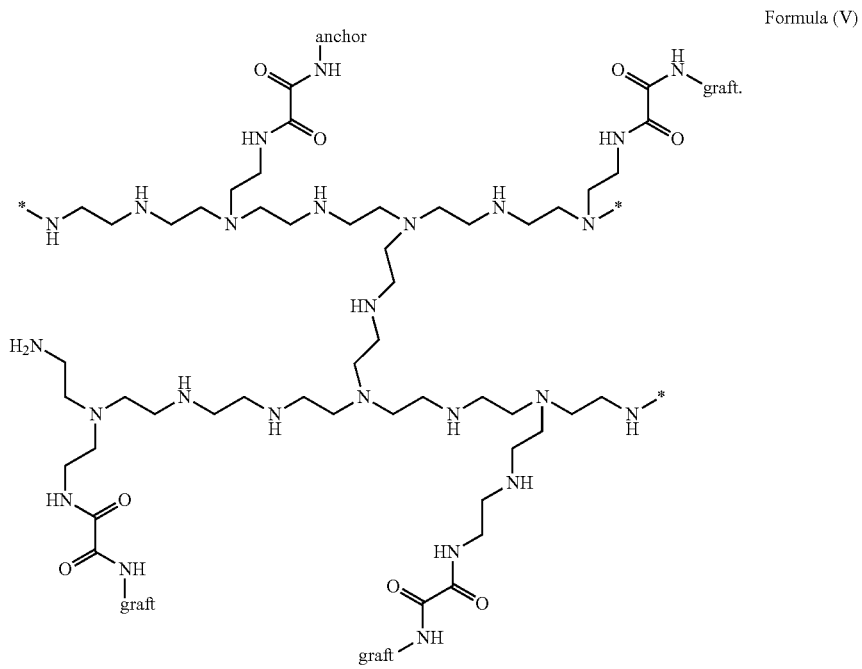

Formula (V)

The graft groups and anchor groups may each be independently selected from those listed in Table 2 respectively Table 3.

The polymeric dispersant is preferably used in an amount of 2 to 600 wt %, more preferably 5 to 200 wt % based on the weight of the pigment.

The method for preparing the polymeric dispersant includes the steps of:
a) forming an oxalylamide polymer by reacting oxalic acid dialkylester with a polymer selected from the group consisting of a polyester, a polyether, a polyamide, a polyacrylate, a polymethacrylate or copolymers thereof; and
b) reacting the oxalylamide polymer with a polymer selected from the group consisting of a linear polymeric moiety, a star shaped polymeric moiety, a dendritic polymeric moiety, a branched polymeric moiety and a hyperbranched polymeric moiety.

In a preferred embodiment, the method further including the steps of
c) forming a structural unit according to the Formula (II) by reacting an oxalic acid dialkylester with a moiety containing a nitrogen containing five or six membered heteroaromatic ring; and
d) reacting the structural unit according to the Formula (II) in step b) or after step b) with the polymer selected from the group consisting of a linear polymeric moiety, a star shaped polymeric moiety, a dendritic polymeric moiety, a branched polymeric moiety and a hyperbranched polymeric moiety.

Non-Aqueous Pigment Dispersions

The non-aqueous pigment dispersion according to a preferred embodiment of the present invention includes in a non-aqueous dispersion medium at least one pigment and the above described polymeric dispersant.

In a preferred embodiment, the non-aqueous pigment dispersion is curable by UV radiation or e-beam.

In a preferred embodiment, the non-aqueous pigment dispersion is an inkjet ink, more preferably an inkjet ink curable by UV radiation or e-beam.

The non-aqueous pigmented dispersion according to a preferred embodiment of the present invention may further also contain at least one surfactant to control the homogenous spreading of the pigment dispersion on a substrate. For a non-aqueous pigmented inkjet ink, the surfactant is important to control the dot size of the ink droplet on a substrate.

In a preferred embodiment the non-aqueous pigmented dispersion is a non-aqueous inkjet ink containing at least one humectant to prevent the clogging of the nozzle, due to its ability to slow down the evaporation rate of ink.

The viscosity of an inkjet ink is preferably lower than 30 mPa·s, more preferably lower than 15 mPa·s, and most preferably between 2 and 10 mPa·s at a shear rate of $100\ s^{-1}$ and a jetting temperature between 10 and 70° C.

The non-aqueous inkjet ink forms preferably part of a non-aqueous CMYK inkjet ink set. The non-aqueous CMYK inkjet ink set may also be extended with extra inks such as red, green, blue, and/or orange to further enlarge the colour gamut of the image. The CMYK ink set may also be extended by the combination of full density and light density inks of both colour inks and/or black inks to improve the image quality by lowered graininess.

Pigments

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548 (AGFA GRAPHICS).

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is CINQUASIA™ Magenta RT-355-D from Ciba Specialty Chemicals.

Also mixtures of pigments may be used in the pigment dispersions. For some inkjet applications, a neutral black inkjet ink is preferred and can be obtained, for example, by mixing a black pigment and a cyan pigment into the ink. The inkjet application may also require one or more spot colours, for example for packaging inkjet printing or textile inkjet printing. Silver and gold are often desired colours for inkjet poster printing and point-of-sales displays.

Non-organic pigments may be used in the pigment dispersions. Particular preferred pigments are C.I. Pigment Metal 1, 2 and 3. Illustrative examples of the inorganic pigments include red iron oxide (III), cadmium red, ultramarine blue, prussian blue, chromium oxide green, cobalt green, amber, titanium black and synthetic iron black.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. An average particle size smaller than 0.050 μm is less desirable for decreased light-fastness, but mainly also because very small pigment particles or individual pigment molecules thereof may still be extracted in food packaging applications. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function However for white pigment dispersions, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a MALVERN™ nano-S available from Goffin-Meyvis. A sample can be, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

The pigments are present in the range of 0.01 to 15%, more preferably in the range of 0.05 to 10% by weight and most preferably in the range of 0.1 to 5% by weight, each based on the total weight of the pigment dispersion. For white pigment dispersions, the white pigment is preferably present in an amount of 3% to 30% by weight of the pigment dispersion, and more preferably 5% to 25%. An amount of less than 3% by weight cannot achieve sufficient covering power and usually exhibits very poor storage stability and ejection property.

Non-Aqueous Dispersion Media

The dispersion medium used in the pigment dispersion according to a preferred embodiment of the present invention is a non-aqueous liquid. The dispersion medium may consist of organic solvent(s).

Suitable organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Suitable examples of organic solvents are disclosed in [0133] to [0146] of EP 1857510 A (AGFA GRAPHICS).

If the pigment dispersion is a curable pigment dispersion or inkjet ink, organic solvent(s) are preferably replaced by one or more monomers and/or oligomers to obtain the liquid dispersion medium. Sometimes, it can be advantageous to add a small amount of an organic solvent to improve the dissolution of the dispersant. The content of organic solvent should be lower than 20 wt %, more preferably lower than 5 wt % based on the total weight of the pigmented inkjet ink and most preferably the curable pigment dispersion doesn't include any organic solvent.

For oil based pigment dispersions and inkjet inks the dispersion medium can be any suitable oil including aromatic oils, paraffinic oils, extracted paraffinic oils, naphthenic oils, extracted napthenic oils, hydrotreated light or heavy oils, vegetable oils and derivatives and mixtures thereof. Paraffinic oils can be normal paraffin types (octane and higher alkanes), isoparaffins (isooctane and higher iso-alkanes) and cycloparaffins (cyclooctane and higher cyclo-alkanes) and mixtures of paraffin oils.

Suitable examples of oils are disclosed in [0151] to [0164] of EP 1857510 A (AGFA GRAPHICS).

Monomers and Oligomers

The monomers and oligomers used in radiation curable pigment dispersions and inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the radiation curable compositions and inks can be adjusted by varying the ratio between the monomers and oligomers.

Particularly preferred monomers and oligomers are those listed in [0106] to [0115] in EP 1911814 A (AGFA GRAPHICS) incorporated herein as a specific reference.

A preferred class of monomers and oligomers are vinyl ether acrylates such as those described in U.S. Pat. No. 6,310,115 (AGFA), incorporated herein by reference. Particularly preferred compounds are 2-(2-vinyloxyethoxy)ethyl(meth)acrylate, most preferably the compound is 2-(2-vinyloxyethoxy)ethyl acrylate.

Photoinitiators

If the pigment dispersion or ink is radiation curable, preferably one or more photoinitiators are present in the pigment dispersion or ink.

The photoinitiator is preferably a free radical initiator. A free radical photoinitiator is a chemical compound that initiates a polymerization of monomers and oligomers when exposed to actinic radiation by the formation of a free radical.

Two types of free radical photoinitiators can be distinguished and used in the pigment dispersion or ink of a preferred embodiment of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in a preferred embodiment of the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl)butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluorophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, LUCERIN™ TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

Suitable cationic photo-initiators include compounds, which form aprotic acids or Bronsted acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

However for safety reasons, in particular for food packaging applications, the photoinitiator is preferably a so-called diffusion hindered photoinitiator. A diffusion hindered photoinitiator is a photoinitiator which exhibits a much lower mobility in a cured layer of the curable liquid or ink than a monofunctional photoinitiator, such as benzophenone. Several methods can be used to lower the mobility of the photoinitiator. One way is to increase the molecular weight of the photoinitiator so that the diffusion speed is reduced, e.g. difunctional photoinitiators or polymeric photoinitiators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator.

A suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A in paragraphs [0074] and [0075] for difunctional and multifunctional photoinitiators, in paragraphs [0077] to [0080] for polymeric photoinitiators and in paragraphs [0081] to [0083] for polymerizable photoinitiators.

A preferred amount of photoinitiator is 0-50 wt %, more preferably 0.1-20 wt %, and most preferably 0.3-15 wt % of the total weight of the curable pigment dispersion or ink.

In order to increase the photosensitivity further, the curable pigment dispersion or ink may additionally contain co-initiators. Suitable examples of co-initiators can be categorized in 4 groups:

(1) tertiary aliphatic amines such as methyldiethanolamine, dimethylethanolamine, triethanolamine, triethylamine and N-methylmorpholine;

(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

When one or more co-initiators are included into the curable pigment dispersion or ink according to a preferred embodiment of the present invention, preferably these co-initiators are diffusion hindered for safety reasons, in particular for food packaging applications.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator.

A preferred diffusion hindered co-initiator is a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

A more preferred diffusion hindered co-initiator is one or more polymerizable co-initiators. In a preferred embodiment the polymerizable co-initiator comprises at least one (meth)acrylate group, most preferably at least one acrylate group.

Preferred diffusion hindered co-initiators are the polymerizable co-initiators disclosed in EP 2053101 A (AGFA) in paragraphs [0088] and [0097].

The curable pigment dispersion or ink preferably comprises the polymerizable co-initiator in an amount of 0.1 to 50 wt %, more preferably in an amount of 0.5 to 25 wt %, most preferably in an amount of 1 to 10 wt % of the total weight of the ink.

Polymerization Inhibitors

The curable pigment dispersion may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total pigment dispersion or ink.

Binders

Non-aqueous pigment dispersions based on organic solvents or oils preferably include a binder resin. The binder functions as a viscosity controlling agent and also provides fixability relative to the polymeric resin substrate, e.g. a polyvinyl chloride substrate, also called vinyl substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstyrene copolymer resin. These binders may be used alone or in a mixture thereof. The binder is preferably a film-forming thermoplastic resin.

The amount of binder resin in a pigment dispersion or ink is preferably in the range of 0.1 to 30 wt %, more preferably 1 to 20 wt %, most preferably 2 to 10 wt % based on the total weight of the pigment dispersion or ink.

Surfactants

The pigment dispersion or ink may contain at least one surfactant. The surfactant(s) can be anionic, cationic, non-ionic, or zwitter-ionic and are usually added in a total quantity less than 20 wt % based on the total weight of the inkjet ink and particularly in a total less than 10 wt % based on the total weight of the pigment dispersion or ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable inkjet ink a fluorinated or silicone compound may be used as a surfactant, but preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Humectants/Penetrants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol. The humectant is preferably added to the inkjet ink formulation in an amount of 0.1 to 40 wt % of the formulation, more preferably 0.1 to 10 wt % of the formulation, and most preferably approximately 4.0 to 6.0 wt %.

Preparation of Pigment Dispersions and Inks

Pigment dispersions may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is performed with cooling to prevent build up of heat, and for radiation curable pigment dispersions as much as possible under light conditions in which actinic radiation has been substantially excluded.

The pigment dispersion may contain more than one pigment, the pigment dispersion or ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical means and residence conditions selected, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Spectral Separation Factor

The spectral separation factor SSF was found to be an excellent measure to characterize a pigmented inkjet ink, as it takes into account properties related to light-absorption (e.g. wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of e.g. a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $A_{max}$ over the absorbance $A_{ref}$ at a reference wavelength.

$$SSF = \frac{A_{max}}{A_{ref}}$$

The SSF is an excellent tool to design inkjet ink sets with large colour gamut. Often inkjet ink sets are now commercialized, wherein the different inks are not sufficiently matched with each other. For example, the combined absorption of all inks does not give a complete absorption over the whole visible spectrum, e.g. "gaps" exist between the absorption spectra of the colorants. Another problem is that one ink might be absorbing in the range of another ink. The resulting colour gamut of these inkjet ink sets is low or mediocre.

EXAMPLES

Materials

All materials used in the following examples were readily available from standard sources such as ALDRICH CHEMICAL Co. (Belgium) and ACROS (Belgium) unless otherwise specified.

NOVOPERM™ Yellow H2G is a C.I. Pigment Yellow 120 from CLARIANT.

HOSTAPERM™ Red E5B02 is a C.I. Pigment Violet 19 from CLARIANT. PV19/PR202 is an abbreviation used for Chromophtal™ Jet Magenta 3BC2 which is a mixed crystal of C.I. Pigment Violet 19 and C.I. Pigment Red 202 from CIBA SPECIALTY CHEMICALS.

SUNFAST™ blue 15:3 is C.I. Pigment Blue 15:3 from SUN CHEMICAL CORPORATION.

SOLSPERSE™ 35100 is a 40% polyethyleneimine core grafted with polyester hyperdispersant solution in butyl acetate available from LUBRIZOL.

SOLSPERSE™ 35000 is obtained via a specific request to the manufacturer LUBRIZOL, to deliver a batch of the same polymeric dispersant SOLSPERSE™ 35100 but without the addition of any solvent.

SOLSPERSE™ 32000 a solid polyethyleneimine core grafted with polyester hyperdispersant from LUBRIZOL.

DB162 sol is an abbreviation used for the polymeric dispersant DISPERBYK™ 162 available from BYK CHEMIE GMBH.

DB162 dry is an abbreviation used for the polymeric dispersant DISPERBYK™ 162 available from BYK CHEMIE GMBH whereof the solvent mixture of 2-methoxy-1-methylethylacetate, xylene and n-butylacetate was removed.

EFKA™ 7476 is a 40% acrylic polymeric dispersant solution in butylacetate and sec-butanol available from CIBA.

EFKA™ 7476 DRY is an abbreviation used for the polymeric dispersant EFKA™ 7476 available from CIBA whereof the solvent mixture of butylacetate and sec-butanol was removed.

Dispersion synergist S1 is a quinacridone derivative represented by the formula:

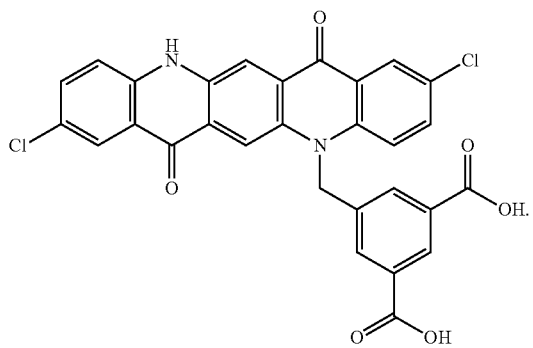

S1

The synthesis of dispersion synergist S1 is described in WO 2007/060254 (AGFA GRAPHICS) under the heading "Synthesis of quinacridone derivative QAD-3".

S2 is the abbreviation used for the dispersion synergist SOLSPERSE™ 5000 from LUBRIZOL.

DEGDEE is diethylene glycol diethyl ether.

SAVINYL™ blue GLS is a phthalocyanine 1:1 copper dye (C.I. Solvent Blue 44) from CLARIANT BENELUX NV.

GENORAD™ 16 is a polymerization inhibitor from RAHN AG.

ITX is an abbreviation used for DAROCUR™ ITX, an isomeric mixture of 2- and 4-isopropylthioxanthone from CIBA SPECIALTY CHEMICALS.

TPO is an abbreviation used for 2,4,6-trimethylbenzoyl-diphenyl-phosphineoxide available under the trade name DAROCUR™ TPO from CIBA SPECIALTY CHEMICALS.

BYK™ UV 3510 is a polyether modified polydimethylsiloxane wetting agent available from BYK CHEMIE GMBH.

GENOCURE™ EPD is ethyl 4-dimethylaminobenzoate from RAHN AG.

DPGDA is dipropyleneglycoldiacrylate from SARTOMER.

PP1 is a polypropylene substrate for which PRIPLAK™ Classic available from ANTALIS, Belgium and manufactured by PRIPLAK, France was used.

PP2 is a polypropylene substrate for which Buplex 3 mm available from EPACAR, Belgium.

PP3 is a polypropylene substrate for which Biprint (3.5 mm thickness, 600 g/m²) available from ANTALIS, Belgium.

PVC1 is a polyvinylchloride substrate for which MD5-100 available from METAMARK, United Kingdom was used.

PVC2 is a polyvinylchloride substrate for which PENSTICK™ 5155 WH available from ANTALIS, Belgium and manufactured by MOLCO, Belgium was used.

PC is a polycarbonate substrate for which BARLO™ TL 30% available from ANTALIS, Belgium and manufactured by BARLO, Germany was used.

PMMA is polymethylmethacrylate substrate for which BARLO™ XT from ANTALIS, Belgium and manufactured by BARLO, Germany was used PS is a polystyrene substrate for which IROSTYRENE™ MAT from ANTALIS, Belgium and manufactured by IROPLASTICS, Austria was used.

Measurement Methods

1. Measurement of SSF

The spectral separation factor SSF of the ink was calculated by using the data of the recorded spectrum of an ink solution and comparing the maximum absorbance to the absorbance at a reference wavelength. The reference wavelength is dependent on the pigment(s) used:

If the colour ink has a maximum absorbance $A_{max}$ between 400 and 500 nm then the absorbance $A_{ref}$ must be determined at a reference wavelength of 600 nm, If the colour ink has a maximum absorbance $A_{max}$ between 500 and 600 nm then the absorbance $A_{ref}$ must be determined at a reference wavelength of 650 nm, If the colour ink has a maximum absorbance $A_{max}$ between 600 and 700 nm then the absorbance $A_{ref}$ must be determined at a reference wavelength of 830 nm.

The absorbance was determined in transmission with a Shimadzu UV-2101 PC double beam-spectrophotometer. The inks were diluted with ethyl acetate to have a pigment concentration according to Table 4.

TABLE 4

| Inkjet ink with maximum absorbance $A_{max}$ | Pigment concentration |
|---|---|
| between 400 and 500 nm | 0.002% |
| between 500 and 600 nm | 0.005% |
| between 600 and 700 nm | 0.002% |

A spectrophotometric measurement of the UV-VIS-NIR absorption spectrum of the diluted ink was performed in transmission-mode with a double beam-spectrophotometer using the settings of Table 5. Quartz cells with a path length of 10 mm were used and ethyl acetate was chosen as a blank.

TABLE 5

| Mode | Absorbance |
|---|---|
| Wavelength range | 240-900 nm |
| Slit width | 2.0 nm |
| Scan interval | 1.0 nm |
| Scan speed | Fast (1165 nm/min) |
| Detector | photo-multiplier (UV-VIS) |

Efficient pigmented inkjet inks exhibiting a narrow absorption spectrum and a high maximum absorbance have a value for SSF of at least 30.

2. Pigment Dispersion Stability

The dispersion stability was evaluated by comparing the SSF before and after a heat treatment of one week at 80° C. Pigmented inkjet inks exhibiting good dispersion stability have a SSF after heat treatment still larger than 30 and a loss in SSF of less than 35% for an individual inkjet or an average loss in SSF of less than 20% for an inkjet ink set.

3. Adhesion

The adhesion was evaluated by a cross-cut test according to ISO2409:1992(E). Paints. International standard. 1992 Aug. 15. by using an ELCOMETER™ 1542 cross hatch cutter with a spacing of 1 mm between the cuts and with a weight of 600 g, in combination with an ISO TESA™ tape (T1079358) 4104/04 PVC tape (adhesion force=10 N/25 mm).

The evaluation was made in accordance with the classification described in Table 6.

TABLE 6

| Classification | Observation |
|---|---|
| 0 | The edges of the cuts are completely smooth: none of the squares of the lattice is detached (=perfect adhesion). |

TABLE 6-continued

| Classification | Observation |
| --- | --- |
| 1 | Detachment of small flakes of the coating at the intersections of the cuts. A cross-cut area not greater than 5% is affected. |
| 2 | The coating has flaked along the edges and/or at the intersections of the cuts. A cross-cut area greater than 5%, but not significantly greater than 15% is affected. |
| 3 | The coating has flaked along the edges of the cuts partly or wholly in large ribbons, and/or it has flaked partly or wholly on different parts of the squares. A cross-cut area significantly greater than 15%, but not significantly greater than 35% is affected. |
| 4 | The coating has flakes along the edges of the cuts in large ribbons, and/or some of the squares has detached partly or wholly. A cross-cut area significantly greater than 35%, but not greater than 65% is affected. |
| 5 | Any degree of flaking that cannot even be classified by the classification 4. |

Example 1

This example illustrates the synthesis method of polymeric dispersants in accordance with a preferred embodiment of the present invention.

Synthesis of oxalylamide-methyl 4-pyridine

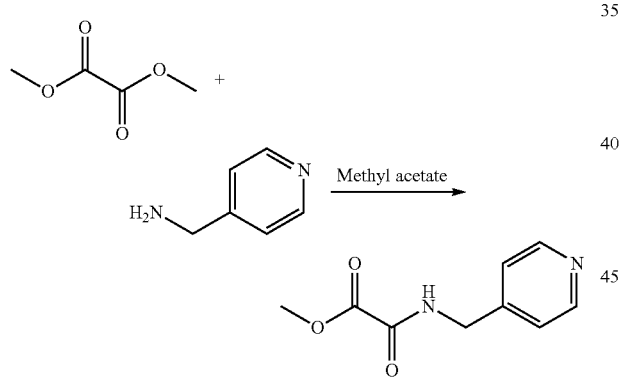

2.2 g of oxalic acid dimethyl ester (0.018 mol) was dissolved in 12.6 mL of methyl acetate in a three-neck flask equipped with a magnetic stirrer, a thermometer and a nitrogen inlet. The mixture was cooled to $-20°$ C. with a dry ice/ethanol bath. Then, 2 g of 4-aminomethylpyridine (0.018 mol) dissolved in 25.1 mL of methyl acetate were added drop wise at $-20°$ C. over 2 hours. An excess of oxalic acid dimethyl ester (1.1 g, 0.009 mol) was added with a funnel to the reaction mixture under constant stirring. The completion of the reaction was determined via thin layer chromatography (TLC) by using MERCK™ TLC Silica Gel 60 $F_{254}$ plates and $CH_2Cl_2$/MeOH 90/10 were used as stationary and mobile phase, respectively. The precipitated solid present in the crude reaction mixture was removed by filtration over Buchner and the solvent was removed by evaporation under reduced pressure. The product was dried overnight at 40° C. in a vacuum oven. 2.93 g of a white-yellowish powder were recovered (yield=81%). A purity of 93.1% was measured by Gas chromatography.

Synthesis of oxalylamide-propyl imidazole

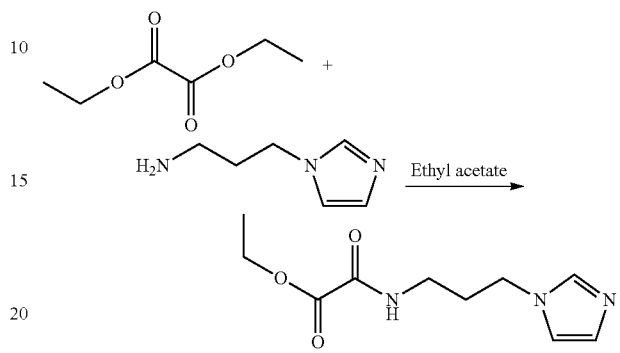

6.2 g of oxalic acid diethyl ester (0.042 mol) and 11 mL of methyl acetate were introduced in a three-neck flask equipped with a magnetic stirrer, a thermometer and a nitrogen inlet. The mixture was cooled to $+10°$ C. with an ice/water bath. Then, 5 g of 1-(3-aminopropyl)imidazole (0.040 mol) dissolved in 22.5 mL of ethyl acetate were added drop wise at $+15°$ C. over 2 hours. The completion of the reaction was determined by thin layer chromatography: MERCK™ TLC Silica Gel 60 $F_{254}$ plates (stationary phase) and $CH_2Cl_2$/MeOH/$NH_4OH$ 88/10/2 (mobile phase). The precipitated solid present in the crude reaction mixture was removed by filtration over Buchner and the solvent was removed by evaporation under reduced pressure. The product was dried overnight at 23° C. in a vacuum oven. 7.25 g of an orange solid were recovered (yield=80%). A purity of 98.5% was measured by Liquid-Chromatography-coupled with Mass spectrometry (LC-MS).

Synthesis of oxalylamide-P(EO-co-PO) copolymer

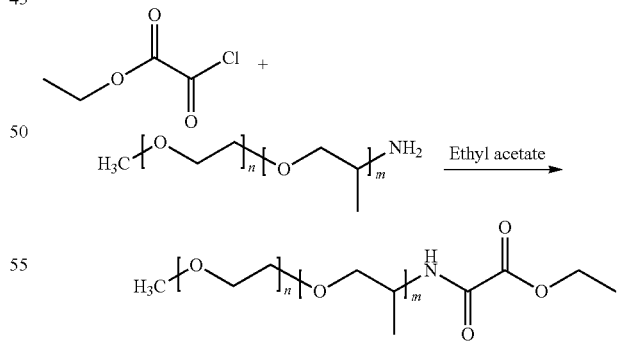

50 g (0.025 mol) of JEFFAMINE™ XTJ-5076. (supplied by Huntsman), 2.91 g of triethyl amine (0.029 mol), a catalytic amount of 4-dimethylaminopyridine and 157.5 mL of ethyl acetate were introduced in a three-neck flask equipped with a magnetic stirrer, a thermometer and a nitrogen inlet. The mixture was cooled to 0° C. with an ice/water bath. Then, 4.2 g of ethyloxalylchloride (0.029 mol) were added drop wise at 0° C. over 2 hours. The reaction mixture was stirred at 23° C.

for an additional 1 hour. The completion of the reaction was determined via thin layer chromatography by using MERCK™ TLC Silica Gel 60 $F_{254}$ plates and $CH_2Cl_2$/MeOH/$NH_4$OH 92/7/1 as stationary and mobile phase, respectively. The precipitated solid present in the crude reaction mixture was removed by filtration over a Büchner and the filtrate was washed with 250 mL of water and 250 mL of brine. Ethyl acetate was removed by evaporation under reduced pressure. The product was dried overnight at 23° C. in a vacuum oven. 51.4 g of a yellowish oil were recovered (yield=98%). The structure was confirmed by $^1$H NMR spectroscopy.

Synthesis of Polymeric Dispersant POL-1

2 g of Epomin SP-200 (polyethylene imine supplied by Nippon Shokubai, Mw=10,000) were dissolved in 125 mL of ethanol at 50° C. under constant stirring. 12 g of oxalylamide-P(EO-co-PO) copolymer were added to the reaction mixture at once and the temperature was raised to ca. 105° C. for 50 hours under nitrogen flow. The solvent was evaporated under reduced pressure and the solid dried in a vacuum oven at 35° C.

Synthesis of Polymeric Dispersant POL-4

3.04 g of EPOMIN™ SP-200 (polyethylene imine supplied by Nippon Shokubai, Mw=10,000) were dissolved in 125 mL of ethanol at 50° C. under constant stirring. 10 g of oxalylamide-P(EO-co-PO) copolymer and 0.89 g of oxalylamide-propyl-imidazole were added to the reaction mixture at once and the temperature was raised to ca. 105° C. for 50 hours under nitrogen flow. The solvent was evaporated under reduced pressure and the solid dried in a vacuum oven at 35° C. The completion of the reaction was determined by thin layer chromatography: MERCK™ TLC Silica Gel 60 $F_{254}$ plates (stationary phase) and $CH_2Cl_2$/MeOH 90/10 (mobile phase).

Synthesis of Polymeric Dispersant POL-10

10 g (0.005 mol) of JEFFAMINE™ XTJ-507 (supplied by Huntsman, Mw=2100) and 0.73 g of oxalic acid diethyl ester (0.005 mol) were stirred under nitrogen flow in a three-neck flask equipped with a Dean-Stark apparatus. The reaction mixture was heated to 105° C. and ethanol was completely distilled over 2 hours. Thin layer chromatography indicated the completion of the reaction by using MERCK™ TLC Silica Gel 60 $F_{254}$ plates and $CH_2Cl_2$/MeOH/$NH_4$OH 92/7/1 as stationary and mobile phases, respectively. No workup was carried-out and the produced oxalylamide-P(EO-co-PO) copolymer (yellowish oil) was directly used for the second step.

1.74 g of EPOMIN™ SP-200 (polyethylene imine supplied by Nippon Shokubai, Mw=10,000) were dissolved in 100 mL of ethanol at 50° C. under constant stirring. 10.5 g of oxalylamide-P(EO-co-PO) copolymer diluted in 25 mL of ethanol were added to the reaction mixture at once and the temperature was raised to ca. 105° C. (reflux) for 3 hours under nitrogen flow. The solvent was evaporated under reduced pressure and the solid dried in a vacuum oven at 35° C.

Synthesis of Polymeric Dispersant POL-11

22.5 g (0.011 mol) of JEFFAMINE™ XTJ-507 (supplied by Huntsman, Mw=2100) and 0.41 g (0.004 mol) of N-4-amino-methylpyridine were stirred in a three-neck flask equipped with a nitrogen inlet and a Dean-Stark apparatus. The reaction mixture was cooled to 5° C. with an ice/water bath. 2.3 g (0.016 mol) of oxalic acid diethyl ester was added drop wise over 1 hour. The reaction mixture was stirred at 23° C. for 1 hour and at 95° C. for 2 hours and ethanol was completely distilled over 3.5 hours. Thin layer chromatography indicated the completion of the reaction by using MERCK™ TLC Silica Gel 60 $F_{254}$ plates and $CH_2Cl_2$/MeOH/$NH_4$OH 92/7/1 as stationary and mobile phases, respectively. No workup was carried-out and the oily mixture of oxalylamide-P(EO-co-PO) copolymer and oxalylamide-methyl-pyridine was directly used for the second step.

3.0 g of EPOMIN™ SP-200 (polyethylene imine supplied by Nippon Shokubai, Mw=10,000) were dissolved in 100 mL of ethanol at 50° C. under constant stirring. 12.6 g of oxalylamide-P(EO-co-PO)/oxalylamide-methyl-pyridine diluted in 40 mL of ethanol were added to the reaction mixture and the temperature was raised to ca. 105° C. (reflux) for 3 hours. After filtration (1 μm), the solvent was evaporated under reduced pressure and the solid dried in a vacuum oven at 35° C.

Synthesis of Polymeric Dispersant POL-12

40 g (0.02 mol) of JEFFAMINE™ XTJ-507 (supplied by Huntsman, Mw=2100) and 2.92 g of oxalic acid diethyl ester (0.02 mol) were stirred under nitrogen flow in a three-neck flask equipped with a Dean-Stark apparatus. The reaction mixture was heated to 95° C. and ethanol was completely distilled over 3.5 hours. Thin layer chromatography indicated the completion of the reaction by using MERCK™ TLC Silica Gel 60 $F_{254}$ plates and $CH_2Cl_2$/MeOH/$NH_4$OH 92/7/1 as stationary and mobile phases, respectively. No workup was carried-out and the produced oxalylamide-P(EO-co-PO) copolymer (yellowish oil) was directly used for the second step.

3.0 g of EPOMIN™ SP-200 (polyethylene imine supplied by Nippon Shokubai, Mw=10,000) were dissolved in 100 mL of ethanol at 50° C. under constant stirring. 9.9 g of oxalylamide-P(EO-co-PO) copolymer and 0.84 g of oxalylamide-methyl-pyridine diluted in 40 mL of ethanol were added to the reaction mixture at once and the temperature was raised to ca. 105° C. (reflux) for 3.5 hours under nitrogen flow. The solvent was evaporated under reduced pressure and the solid dried in a vacuum oven at 35° C.

Overview Polymeric Dispersants

The composition of the synthesized polymeric dispersants is shown in Table 7. The PEI-feed in Table 7 shows the amount of EPOMIN™ SP200 used in the preparation of the polymeric dispersant by expressing it as a weight ratio and as mol %. The graft-feed shows the amount of the oxalamide copolymer of propyleneoxide and exthyleneoxide ($PPO_{29}$-$EO_6$-oxalylamide) used in the preparation of the polymeric dispersant by expressing it as a weight ratio and as mol %. The anchor-feed shows the amount of imidazole-propyl-oxalamide (=IPO) or pyridine-methyl-oxalamide (=PMO) used in the preparation of the polymeric dispersant by expressing it as a weight ratio and as mol %.

The synthesis of polymeric dispersants POL-2 and POL-3 follows the procedure described for the synthesis of polymeric dispersant POL-1 by adjusting the amounts of reagents as it is indicated in Table 7.

The synthesis of polymeric dispersants POL-5 and POL-6 follows the procedure described for the synthesis of polymeric dispersant POL-4 by adjusting the amounts of reagents as it is indicated in Table 7.

The synthesis of polymeric dispersants POL-7, POL-8 and POL-9 follows the procedure described for the synthesis of polymeric dispersant POL-4 by replacing imidazole-propyl-oxalylamide by pyridine-methyl-oxalylamide and by adjusting the amounts of reagents as it is indicated in Table 7.

The synthesis of polymeric dispersant POL-13 follows the procedure described for the synthesis of polymeric dispersant POL-12 by replacing pyridine-methyl-oxalylamide by imidazole-propyl-oxalylamide and by adjusting the amounts of reagents as it is indicated in Table 7.

TABLE 7

| Polymeric dispersant | PEI-feed wt-ratio | PEI-feed mol % | Graft-feed wt-ratio | Graft-feed mol % | Anchor-feed Type | Anchor-feed wt-ratio | Anchor-feed mol % |
| --- | --- | --- | --- | --- | --- | --- | --- |
| POL-1 | 1 | 89 | 6 | 11 | — | — | — |
| POL-2 | 1 | 79 | 13 | 21 | — | — | — |
| POL-3 | 1 | 75 | 16.5 | 25 | — | — | — |
| POL-4 | 1 | 89 | 3.3 | 6 | IPO | 0.3 | 5 |
| POL-5 | 1 | 79 | 6.8 | 11 | IPO | 0.7 | 10 |
| POL-6 | 1 | 75 | 8.5 | 13 | IPO | 0.9 | 12 |
| POL-7 | 1 | 89 | 3.3 | 6 | PMO | 0.3 | 5 |
| POL-8 | 1 | 79 | 6.8 | 11 | PMO | 0.6 | 10 |
| POL-9 | 1 | 75 | 8.5 | 13 | PMO | 0.7 | 12 |
| POL-10 | 1 | 89 | 6 | 11 | — | — | — |
| POL-11 | 1 | 90 | 4.1 | 7.5 | PMO | 0.1 | 2.5 |
| POL-12 | 1 | 89 | 3.3 | 6 | PMO | 0.3 | 5 |
| POL-13 | 1 | 89 | 3.3 | 6 | IPO | 0.3 | 5 |

The molecular weight of the copolymers ($M_n$, $M_w$, $M_w/M_n$) was analyzed by size exclusion chromatography by using dimethyl acetamide/0.21% LiCl as an eluent and 3 mixed-B columns that were calibrated against linear polystyrene standards. The analytical results are given in Table 8.

TABLE 8

| Polymeric dispersant | $M_n$ | $M_z$ | $M_w/M_n$ |
| --- | --- | --- | --- |
| POL-1 | 28,474 | 76,064 | 2.07 |
| POL-2 | 21,325 | 90,153 | 3.09 |
| POL-3 | 17,873 | 89,546 | 3.54 |
| POL-4 | 38,490 | 110,261 | 1.46 |
| POL-5 | 26,426 | 79,089 | 2.25 |
| POL-6 | 17,545 | 71,018 | 2.84 |
| POL-7 | 35,072 | 83,286 | 1.76 |
| POL-8 | 30,281 | 81,020 | 2.09 |
| POL-9 | 17,153 | 70,588 | 2.87 |
| POL-10 | 20,321 | 59,795 | 2.23 |
| POL-11 | 25,086 | 72,201 | 2.15 |
| POL-12 | 21,850 | 53,891 | 1.94 |
| POL-13 | 27,100 | 58,610 | 1.80 |

Example 2

This example illustrates the advantage in dispersion stability of the polymeric dispersant in accordance with a preferred embodiment of the present invention for preparing a CMY-inkjet ink set.

Preparation of Inkjet Ink Sets

All the comparative inkjet ink sets COMP-1 to COMP-3 and inventive inkjet ink sets INV-1 to INV-9 were prepared in the same manner to obtain a composition as described in Table 9, using the pigments of Table 10 and the polymeric dispersants according to Table 11.

TABLE 9

| Component | Yellow ink wt % | Magenta ink wt % | Cyan ink wt % |
| --- | --- | --- | --- |
| Pigment | 5.00 | 5.00 | 5.00 |
| Dispersion synergist S2 | — | — | 1.25 |
| Polymeric dispersant | 5.00 | 5.00 | 5.00 |
| DEGDEE | 90.00 | 90.00 | 88.75 |

TABLE 10

| Ink of ink set | Pigment |
| --- | --- |
| Yellow ink | Novoperm ™ Yellow H2G |
| Magenta ink | Hostaperm ™ Red E5B02 |
| Cyan ink | Sunfast ™ blue 15:3 |

TABLE 11

| Inkjet ink set | Polymeric dispersant |
| --- | --- |
| COMP-1 | S35000 |
| COMP-2 | S32000 |
| COMP-3 | EFKA ™ 7476 DRY |
| INV-1 | POL-1 |
| INV-2 | POL-2 |
| INV-3 | POL-3 |
| INV-4 | POL-4 |
| INV-5 | POL-5 |
| INV-6 | POL-6 |
| INV-7 | POL-7 |
| INV-8 | POL-8 |
| INV-9 | POL-9 |

A pigment dispersion was made by mixing the pigment, the polymeric dispersant and the organic solvent DEGDEE with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lit and put on the roller mill for three days. The speed was set at 150 rpm. After milling, the dispersion was separated from the beads using a filter cloth.

Evaluation and Results

The spectral separation factor (SSF) of each ink was determined directly after preparation as well as after a heat treatment of one week at 80° C. The average % Loss is the average percentage loss in SSF after a heat treatment of one week at 80° C. for the three inkjet inks of the ink set. The results for the comparative inkjet ink sets COMP-1 to COMP-3 and inventive inkjet ink sets INV-1 to INV-9 are given in Table 12. "FLOC" means that flocculation of the ink was observed. "GEL" means that a jellification of the ink was observed.

TABLE 12

| Ink set | Yellow ink SSF | Yellow ink % Loss | Magenta Ink SSF | Magenta Ink % Loss | Cyan Ink SSF | Cyan Ink % Loss | Average % Loss |
| --- | --- | --- | --- | --- | --- | --- | --- |
| COMP-1 | 40 | 18% | 120 | 74% | 137 | 20% | 37% |
| COMP-2 | 35 | 6% | 86 | 63% | 72 | 0% | 23% |
| COMP-3 | FLOC | FLOC | 19 | GEL | GEL | GEL | — |
| INV-1 | 36 | 3% | 106 | 24% | 93 | 9% | 12% |
| INV-2 | 29 | 10% | 95 | 20% | 40 | 0% | 10% |
| INV-3 | 30 | 10% | 84 | 18% | 43 | 2% | 10% |
| INV-4 | 54 | 0% | 81 | 0% | 88 | 0% | 0% |
| INV-5 | 43 | 35% | 95 | 5% | 80 | 0% | 13% |
| INV-6 | 62 | 34% | 78 | 0% | 60 | 8% | 14% |
| INV-7 | 53 | 0% | 131 | 21% | 99 | 0% | 7% |
| INV-8 | 39 | 23% | 109 | 28% | 83 | 11% | 21% |
| INV-9 | 57 | 35% | 108 | 22% | 58 | 0% | 19% |

From Table 12, it should be clear that, although the commercial dispersants function well for some inks of the comparative inkjet ink sets COMP-1 to COMP-3, only the polymeric dispersants of preferred embodiments of the present invention work well in all inks of an inkjet ink set. The advantage of such a "universal" polymeric dispersant is that it is not necessary to use different polymeric dispersants for different colour inkjet inks in order to have optimal dispersion quality and stability. The use of different polymeric dispersants in different colour inkjet inks of the ink set may lead to additional problems in jetting performance due to inherent differences of polymeric dispersants in viscosity and interaction with other ink components and with the ink receiver.

Example 3

This example illustrates the advantages in adhesion to substantially non-absorbing ink receivers of a UV-curable inkjet inks containing a polymeric dispersant in accordance with a preferred embodiment of the present invention.

Preparation of Inkjet Inks

All the comparative UV curable inkjet inks COMP-4 to COMP-5 and the inventive UV curable inkjet inks INV-10 to INV-20 were prepared in the same manner to obtain a composition as described in Table 13 using a polymeric dispersant according to Table 14.

TABLE 13

| Component | wt % in the ink |
| --- | --- |
| Polymeric dispersant | 3.00 |
| SAVINYL ™ blue GLS | 2.00 |
| GENORAD ™ 16 | 1.05 |
| BYK ™ UV 3510 | 0.10 |
| ITX | 5.00 |
| TPO | 4.95 |
| GENOCURE ™ EPD | 5.00 |
| DPGDA | 78.90 |

TABLE 14

| Inkjet ink | Polymeric dispersant |
| --- | --- |
| COMP-4 | S35000 |
| COMP-5 | D162 sol |
| COMP-6 | D162 dry |
| COMP-7 | S32000 |
| INV-10 | POL-1 |
| INV-11 | POL-2 |
| INV-12 | POL-3 |
| INV-13 | POL-4 |
| INV-14 | POL-5 |
| INV-15 | POL-6 |
| INV-16 | POL-7 |

TABLE 14-continued

| Inkjet ink | Polymeric dispersant |
| --- | --- |
| INV-17 | POL-8 |
| INV-18 | POL-9 |
| INV-19 | POL-10 |
| INV-20 | POL-11 |

A UV curable inkjet ink was made by mixing the polymeric dispersant, the dye, the photoinitiating system, the stabilizers, the wetting agent and the UV-curable monomer DPGDA for 24 hours at 23° C.

Evaluation and Results

The UV curable inkjet inks prepared according to Table 13 were evaluated by coating them under atmospheric conditions on the ink receivers PP1, PP2, PP3, PVC1, PVC2, PC, PMMA and PS by using a bar coater and a 10 mm wired bar. Each coated ink layer was cured by using a Fusion DRSE-120 conveyer, equipped with a Fusion F600s Ultra-Violet Lamp (D-bulb, 1=200-400 nm) which transported the samples under the UV lamp (240 W/cm, 100% irradiation power) on a conveyer belt at a speed of 20 m/min. Each coating was kept in a dark room for 24 hours before the adhesion quality was tested. The results are given in Table 15.

TABLE 15

| Inkjet ink | PP1 | PP2 | PP3 | PVC1 | PVC2 | PC | PMMA | PS | Sum all |
| --- | --- | --- | --- | --- | --- | --- | --- | --- | --- |
| COMP-4 | 3 | 4 | 5 | 3 | 3 | 4 | 5 | 4 | 30 |
| COMP-5 | 5 | 5 | 5 | 0 | 3 | 0 | 5 | 0 | 23 |
| COMP-6 | 3 | 4 | 5 | 1 | 3 | 2 | 5 | 2 | 24 |
| COMP-7 | 5 | 5 | 5 | 0 | 3 | 0 | 5 | 5 | 28 |
| INV-10 | 3 | 4 | 5 | 2 | 2 | 0 | 5 | 4 | 25 |
| INV-11 | 5 | 5 | 5 | 2 | 1 | 0 | 5 | 2 | 25 |
| INV-12 | 1 | 4 | 5 | 1 | 1 | 0 | 5 | 5 | 22 |
| INV-13 | 5 | 5 | 5 | 2 | 4 | 1 | 5 | 5 | 32 |
| INV-14 | 5 | 5 | 5 | 4 | 1 | 0 | 5 | 5 | 30 |
| INV-15 | 5 | 5 | 5 | 2 | 2 | 0 | 5 | 5 | 29 |
| INV-16 | 2 | 5 | 5 | 0 | 4 | 0 | 5 | 5 | 26 |
| INV-17 | 5 | 5 | 5 | 2 | 1 | 0 | 5 | 5 | 28 |
| INV-18 | 4 | 4 | 5 | 0 | 1 | 0 | 5 | 5 | 24 |
| INV-19 | 0 | 1 | 4 | 0 | 5 | 0 | 5 | 0 | 15 |
| INV-20 | 0 | 3 | 4 | 0 | 5 | 0 | 5 | 1 | 18 |

From Table 15, it can be seen that an inkjet ink containing a polymeric dispersant generally outperforms commercial dispersants in adhesion on different ink receivers. This is especially true when the polymeric dispersant has a molecular weight $M_n$ smaller than 30,000 and either pyridine anchor groups are used or no heteroaromatic anchor groups at all are used. The use of imidazole anchor groups exhibits only limited improvement in adhesion quality.

Example 4

Some pigments, especially some quinacridone pigments, can only be dispersed adequately using a dispersion synergist. This example illustrates that good dispersion stability of such a quinacridone pigment can even be obtained in the absence of a dispersion synergist when using a polymeric dispersant in accordance with preferred embodiments of the present invention.

Preparation of Inkjet Inks

All the comparative inkjet ink COMP-8 and COMP-9 and inventive inkjet ink INV-21 to INV-29 were prepared in the same manner to obtain a composition as described in Table 16 and Table 17.

An inkjet ink was made by mixing the pigment, the polymeric dispersant and the organic solvent DEGDEE with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lit and put on the roller mill for three days. The speed was set at 150 rpm. After milling, the dispersion was separated from the beads using a filter cloth.

TABLE 16

| wt % of | COMP-8 | COMP-9 | INV-21 | INV-22 | INV-23 |
|---|---|---|---|---|---|
| PV19/PR202 | 5.00 | 5.00 | 5.00 | 5.00 | 5.00 |
| S1 | — | 1.25 | — | — | — |
| D162 dry | 5.00 | 5.00 | — | — | — |
| POL-1 | — | — | 5.00 | — | — |
| POL-2 | — | — | — | 5.00 | — |
| POL-3 | — | — | — | — | 5.00 |
| DEGDEE | 90.00 | 88.75 | 90.00 | 90.00 | 90.00 |

TABLE 17

| wt % of | INV-24 | INV-25 | INV-26 | INV-27 | INV-28 | INV-29 |
|---|---|---|---|---|---|---|
| PV19/PR202 | 5.00 | 5.00 | 5.00 | 5.00 | 5.00 | 5.00 |
| POL-4 | 5.00 | — | — | — | — | — |
| POL-5 | — | 5.00 | — | — | — | — |
| POL-6 | — | — | 5.00 | — | — | — |
| POL-7 | — | — | — | 5.00 | — | — |
| POL-8 | — | — | — | — | 5.00 | — |
| POL-9 | — | — | — | — | — | 5.00 |
| DEGDEE | 90.00 | 90.00 | 90.00 | 90.00 | 90.00 | 90.00 |

Evaluation and Results

The spectral separation factor (SSF) of each ink was determined directly after preparation as well as after a heat treatment of one week at 80° C. The % Loss is the percentage loss in SSF after a heat treatment of one week at 80° C. The results for the comparative inkjet inks COMP-8 and COMP-9 and inventive inkjet inks INV-21 to INV-29 are given in Table 18.

TABLE 18

| Inkjet ink | SSF | SSF after 1 week at 80° C. | % Loss |
|---|---|---|---|
| COMP-8 | 122 | 49 | 60% |
| COMP-9 | 185 | 169 | 9% |
| INV-21 | 183 | 115 | 37% |
| INV-22 | 115 | 84 | 27% |
| INV-23 | 110 | 77 | 30% |
| INV-24 | 160 | 121 | 24% |
| INV-25 | 133 | 99 | 26% |
| INV-26 | 127 | 103 | 19% |
| INV-27 | 198 | 152 | 23% |
| INV-28 | 119 | 85 | 29% |
| INV-29 | 137 | 103 | 25% |

Table 18 shows that good dispersion stability can be obtained for the combination of a mixed crystal of C.I. Pigment Violet 19 and C.I. Pigment Red 202 and a commercial dispersant in a comparative inkjet ink COMP-9 containing a dispersion synergist, but not in the absence thereof as shown by the comparative inkjet ink COMP-8. All inventive inkjet inks INV-21 to INV-29 exhibit good dispersion stability even in the absence of the expensive dispersion synergist.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A non-aqueous pigment dispersion comprising:
   an organic pigment;
   a non-aqueous dispersion medium; and
   a polymeric dispersant including at least one oxalylamide structural unit according to Formula (I):

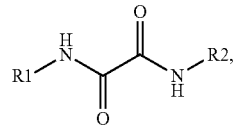

Formula (I)

wherein:
   R1 represents a first polymeric moiety selected from the group consisting of a linear polymeric moiety, a star shaped polymeric moiety, a dendritic polymeric moiety, a branched polymeric moiety, and a hyperbranched polymeric moiety; and
   R2 represents a second polymeric moiety selected from the group consisting of a polyester, a polyether, a polyamide, a polyacrylate, a polymethacrylate, or copolymers thereof; and
   the organic pigment is a quinacridone pigment.

2. The non-aqueous pigment dispersion according to claim 1, wherein the first polymeric moiety is substituted by at least one structural unit according to Formula (II):

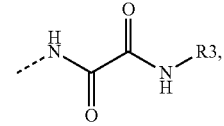

Formula (II)

wherein:
   R3 represents a functional group including at least one nitrogen containing five or six membered heteroaromatic ring.

3. The non-aqueous pigment dispersion according to claim 1, wherein the first polymeric moiety is a branched polymeric moiety or a hyperbranched polymeric moiety.

4. The non-aqueous pigment dispersion according to claim 1, wherein the polymeric dispersant is a polyethylene imine derivative.

5. The non-aqueous pigment dispersion according to claim 1, wherein the second polymeric moiety is selected from the group consisting of a polyester and a polyether.

6. The non-aqueous pigment dispersion according to claim 2, wherein R3 comprises at least one nitrogen containing five or six membered heteroaromatic ring selected from the group consisting of benzimidazole, imidazole, and pyridine.

7. The non-aqueous pigment dispersion according to claim 6 wherein the at least one nitrogen containing five or six membered heteroaromatic ring is pyridine.

8. The non-aqueous pigment dispersion according to claim 1, wherein the polymeric dispersant is represented by Formula (III):

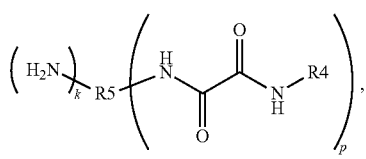

Formula (III)

wherein:
R4 represents a polymeric chain selected from the group consisting of a polyether and a polyester;
R5 represents a branched polymeric core or a hyperbranched polymeric core;
k represents an integer from 0 to 600; and
p represents an integer from 1 to 900.

9. The non-aqueous pigment dispersion according to claim 1, wherein the polymeric dispersant is represented by Formula (IV):

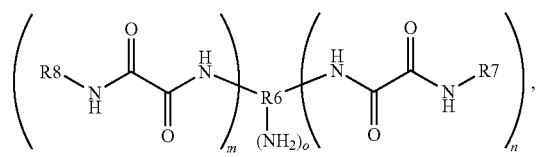

Formula (IV)

wherein:
R6 represents a branched polymeric core or a hyperbranched polymeric core;
R7 represents a polymeric chain selected from the group consisting of a polyether and a polyester;
R8 represents a functional group including at least one nitrogen containing five or six membered heteroaromatic ring;
n represents an integer from 1 to 900;
m represents an integer from 0 to 720; and
o represents an integer from 0 to 600.

10. A non-aqueous pigment dispersion comprising:
a pigment;
a non-aqueous dispersion medium; and
a polymeric dispersant including at least one oxalylamide structural unit according to Formula (I):

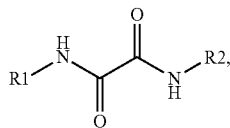

Formula (I)

wherein:
R1 represents a first polymeric moiety selected from the group consisting of a linear polymeric moiety, a star shaped polymeric moiety, a dendritic polymeric moiety, a branched polymeric moiety, and a hyperbranched polymeric moiety;
R2 represents a second polymeric moiety selected from the group consisting of a polyester, a polyether, a polyamide, a polyacrylate, a polymethacrylate, or copolymers thereof; and
the pigment dispersion is curable by UV radiation or an e-beam.

11. The non-aqueous pigment dispersion according to claim 1, wherein the pigment dispersion is an inkjet ink.

12. A non-aqueous inkjet ink set comprising:
at least one inkjet ink containing a non-aqueous pigment dispersion comprising:
a pigment;
a non-aqueous dispersion medium; and
a polymeric dispersant including at least one oxalylamide structural unit according to Formula (I):

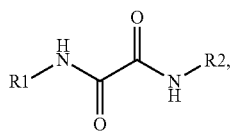

Formula (I)

wherein:
R1 represents a first polymeric moiety selected from the group consisting of a linear polymeric moiety, a star shaped polymeric moiety, a dendritic polymeric moiety, a branched polymeric moiety, and a hyperbranched polymeric moiety; and
R2 represents a second polymeric moiety selected from the group consisting of a polyester, a polyether, a polyamide, a polyacrylate, a polymethacrylate, or copolymers thereof.

13. A method for preparing a non-aqueous pigment dispersion comprising the steps of:
a) providing the polymeric dispersant and the pigment as defined in claim 1; and
b) milling the pigment in the dispersion medium in the presence of the polymeric dispersant.

* * * * *